United States Patent
Romero

(10) Patent No.: US 8,862,734 B2
(45) Date of Patent: Oct. 14, 2014

(54) SYSTEM AND METHOD FOR SELECTIVELY CONTROLLING THE ADDITION OF RESERVE COMPUTING CAPACITY

(75) Inventor: Francisco Romero, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2305 days.

(21) Appl. No.: 11/586,228

(22) Filed: Oct. 25, 2006

(65) Prior Publication Data
US 2008/0104245 A1    May 1, 2008

(51) Int. Cl.
*G06F 15/173*    (2006.01)
*G06F 13/28*    (2006.01)
*G06F 9/50*    (2006.01)

(52) U.S. Cl.
CPC .................. *G06F 9/5083* (2013.01)
USPC .......................... 709/226; 711/147

(58) Field of Classification Search
USPC .......................................................... 709/226
See application file for complete search history.

(56) References Cited

U.S. PATENT DOCUMENTS

| | | | |
|---|---|---|---|
| 6,480,861 B1 | 11/2002 | Kanevsky et al. | |
| 6,874,036 B2 * | 3/2005 | Rawson, III | 709/246 |
| 2002/0120744 A1 * | 8/2002 | Chellis et al. | 709/226 |
| 2003/0105868 A1 * | 6/2003 | Kimbrel et al. | 709/226 |
| 2003/0126379 A1 * | 7/2003 | Kaushik et al. | 711/150 |
| 2003/0187970 A1 * | 10/2003 | Chase et al. | 709/223 |
| 2004/0199632 A1 * | 10/2004 | Romero et al. | 709/226 |
| 2004/0243660 A1 * | 12/2004 | Chew et al. | 709/200 |
| 2005/0188075 A1 | 8/2005 | Dias et al. | |

FOREIGN PATENT DOCUMENTS

| | | | | |
|---|---|---|---|---|
| EP | 0905621 | | 3/1999 | |
| EP | 1113629 A2 * | | 7/2001 | H04L 12/56 |
| EP | 1168880 A2 * | | 1/2002 | H04Q 7/38 |
| WO | WO 9848561 A1 * | | 10/1998 | H04M 3/56 |

OTHER PUBLICATIONS

Milojičić, D. S. et al., Process migration. ACM Comput. Surv. 32, 3 (Sep. 2000), 241-299.*

* cited by examiner

*Primary Examiner* — Kostas Katsikis

(57) ABSTRACT

In one embodiment, a system and method is disclosed for changing the resource availability of a particular user in a manner calculated to add the least cost to the user. A cluster of partition servers are arranged, in one embodiment, with a master controller for keeping track at any point in time as to the different licensing costs involved with different methods of adding resource capacity. When a user requires additional capacity the system calculates which of several possible resource enhancements to initiate based upon a least cost analysis.

20 Claims, 4 Drawing Sheets

| OPERATION COST TABLE MAINTAINED PER PARTITION | | | |
|---|---|---|---|
| OPERATION | RESOURCE | COST ($) | AVAILABLE |
| INTRATRANSFER | CPU | 0 | YES |
| INTERTRANSFER | CPU | 23/OPERATION | NO |
| TEMPORARY | CPU | 87/MINUTE | YES |
| ⋮ | ⋮ | ⋮ | ⋮ |

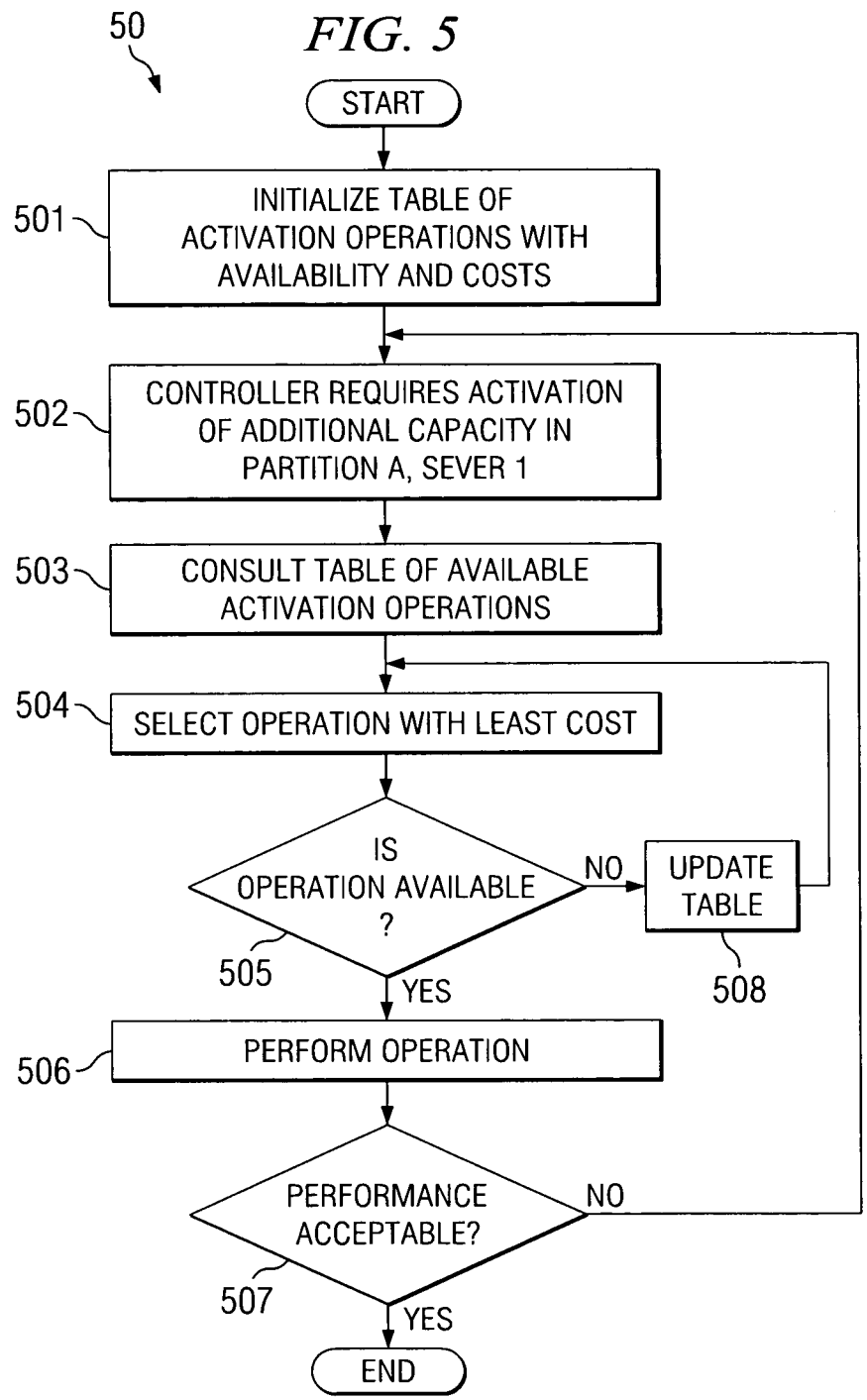

SYSTEM AND METHOD FOR SELECTIVELY CONTROLLING THE ADDITION OF RESERVE COMPUTING CAPACITY

CROSS-REFERENCE TO RELATED APPLICATIONS

This application is related to co-pending and commonly assigned U.S. patent application Ser. No. 09/709,705, filed Nov. 9, 2000 entitled "APPARATUS AND METHOD TO AUTOMATICALLY ACTIVATE A RESERVE RESOURCE," Ser. No. 10/394,608, filed Mar. 21, 2003 entitled "AN ASSEMBLY AND METHOD FOR BALANCING PROCESSORS IN A PARTITION SERVER," and Ser. No. 11/261,298 filed Oct. 28, 2005 entitled "MULTIPLE SERVER WORKLOAD MANAGEMENT USING INSTANT CAPACITY PROCESSORS" the disclosures of which are hereby incorporated herein by reference.

FIELD OF THE INVENTION

This invention relates to computer systems and more particularly to the addition of reserve computing capacity.

DESCRIPTION OF RELATED ART

It has become common practice in computer server architectures to provide reserve capacity features, i.e., the ability for certain server components to be available physically but not activated until the need for such additional components arises. Using such an approach users can have systems with inactive processors that are activated, either permanently or temporarily, only when needed. The user initially pays only for the processors actually actuated which is a fraction of the cost of a system with a full compliment of processors (or other components). When each additional processor (or other component) is activated the user is invoiced for the activated component. This invoice could be a one-time payment or in some instances, a per diem charge.

Reserve capacity is activated manually when needed. This is suboptimal because spikes in demand that require immediate access to additional resources could happen at off hours and for short time frames, which makes manual activation difficult. Recent developments in workload management, as listed above have proposed several approaches to managing capacity automatically. These are, for example: allowing for the automatic migration of reserve processor licenses across partitions to react to spike in demand in one of the partitions; automatically migrating reserve processor licenses across servers; and automatically deploying temporary reserve capacity.

BRIEF SUMMARY OF THE INVENTION

In one embodiment, a system and method is disclosed for changing the resource availability of a particular user in a manner calculated to add the least cost to the user. A cluster of partition servers are arranged, in one embodiment, with a master controller for keeping track at any point in time as to the different licensing costs involved with different methods of adding resource capacity. When a user requires additional capacity the system calculates which of several possible resource enhancements to initiate based upon a least cost analysis.

BRIEF DESCRIPTION OF THE DRAWINGS

For a more complete understanding of the present invention, reference is now made to the following descriptions taken in conjunction with the accompanying drawings, in which:

FIGS. 3-5 have one embodiment of a workload management system;

FIG. 4 shows an example of a cost chart for various operations; and

FIG. 5 shows one embodiment of a process for the selective control of reserve capacity additions.

DETAILED DESCRIPTION

Figure 1:
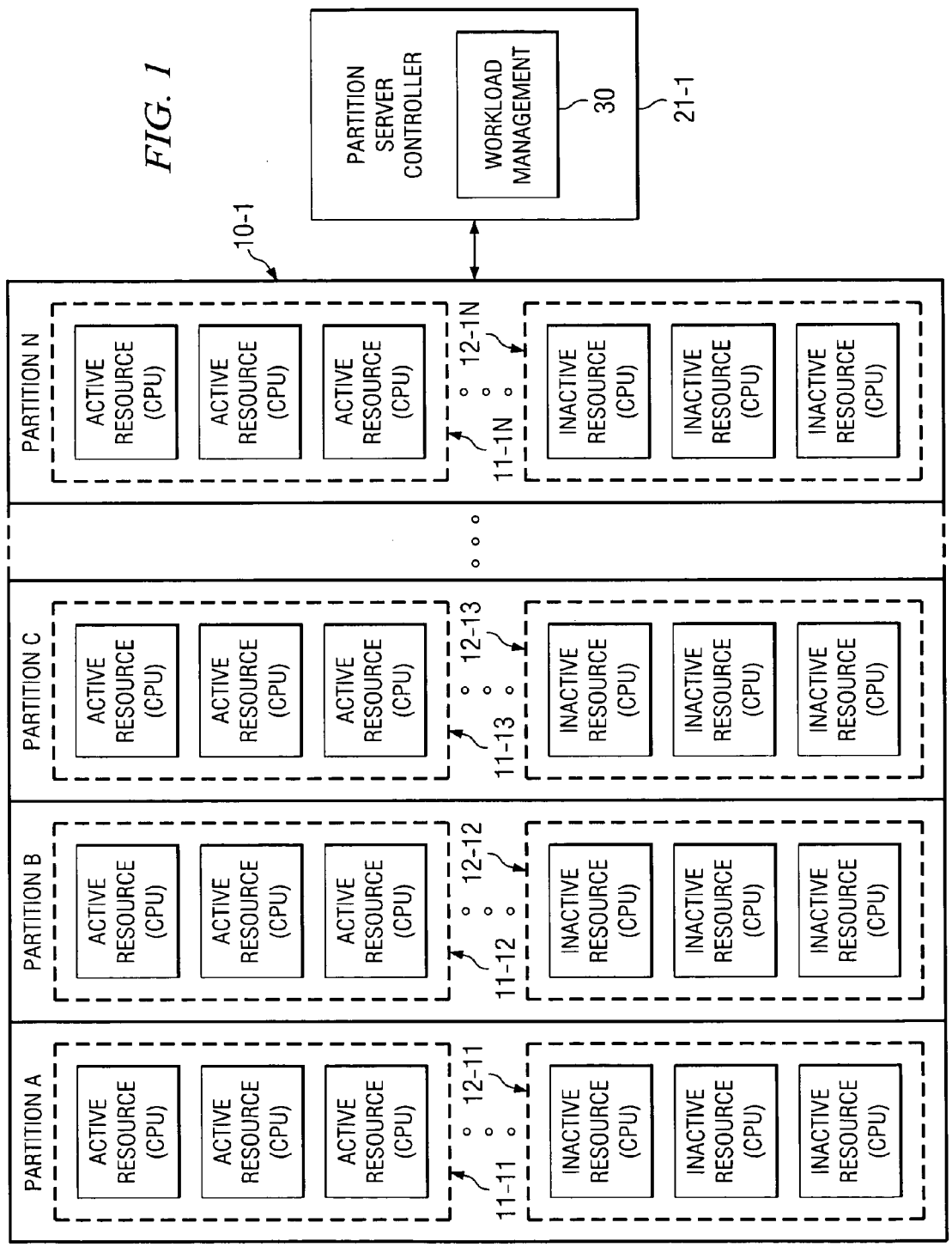
FIG. 1 shows one embodiment of a partition server having both active and inactive resources thereon.

FIG. 1 shows one embodiment 10-1 of a partition server having both active (11-11 through 11-1N) and inactive (12-11 through 12-1N) resources controlled by partition server controller 21-1 having therein workload management system 30.

As shown, any number of partitions (A-N) can be set up and within each partition the number of active resources and inactive resources can be any number. As shown in FIG. 1, the active resources and the inactive resources are CPUs, but this is only representative of the different resources which could be, for example, input/output devices, applications, bandwidth allocations, etc. CPUs and I/O devices are examples of electronic components. As discussed, from time to time partition A, for example, may become overloaded and may require more CPUs, than the user has paid for. In such a situation it would be desirable to activate one or more of the inactive resources 12-11 such that the user would pay the license fee for the additional resources. The problem being that there are different types of resources that can be allocated. For example, it could be possible to activate inactive resources in the same partition or to borrow an active or inactive resource from another partition for a period of time. These different possibilities will be discussed hereafter.

Figure 2:
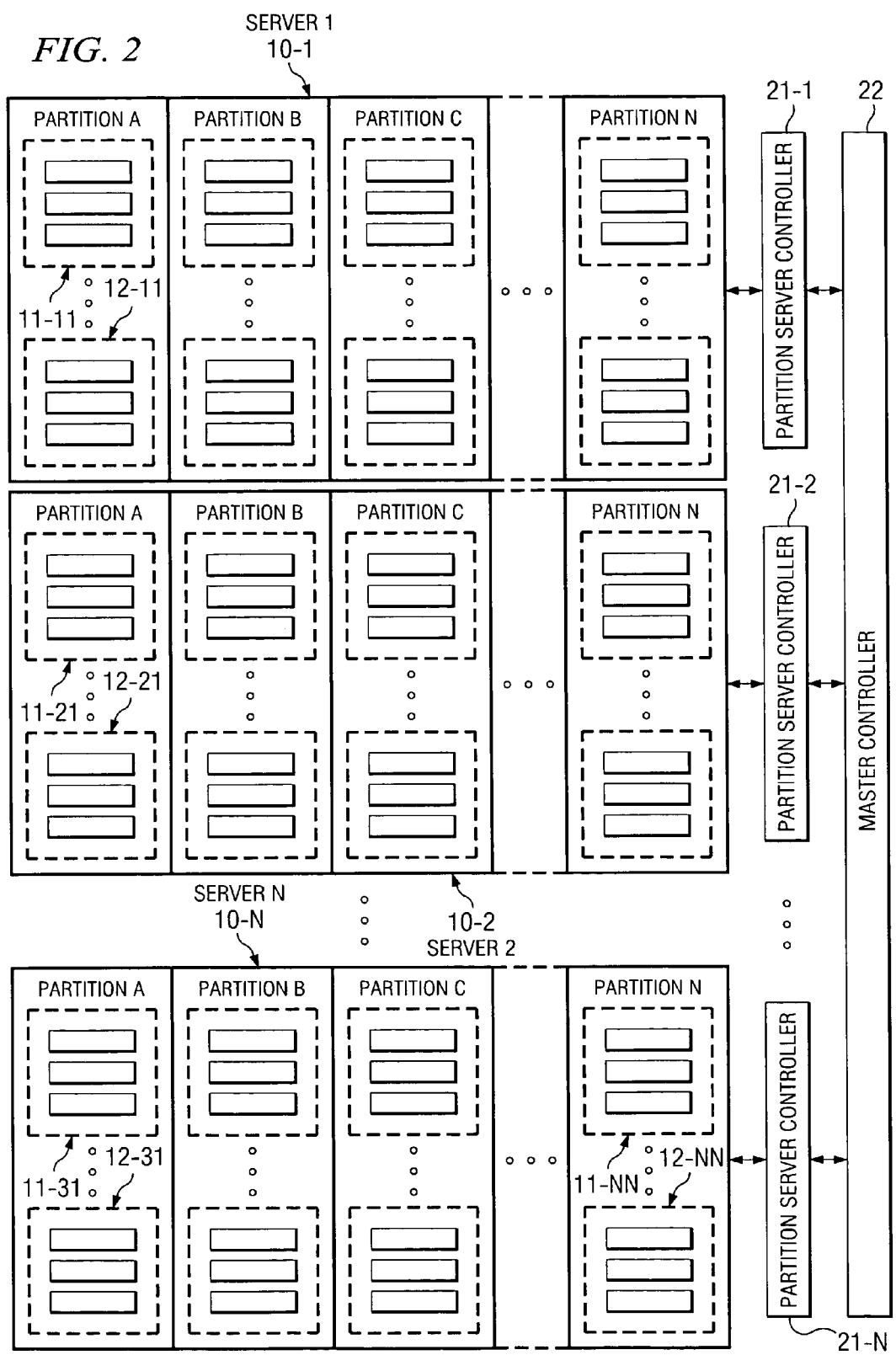
FIG. 2 shows one embodiment of a cluster of partition servers.

FIG. 2 shows one embodiment 20 of a cluster of partition servers 10-1 through 10-N. Each server is controlled by a partition server controller, such as partition controllers 21-1 through 21-N which servers are in turn controlled by master controller 22. Master controller 22 effectively acts as an arbitrator of requests coming from the different controllers. The purpose of arranging the partition servers into clusters is so that an active resource in, for example, cluster 10-2 may be deactivated in order to activate an inactive resource in server 10-1. This would be at a cost X to the user, where X is related to the licensing cost required to manage the cluster servers so as to control license migration between the servers.

Figures 3, 4:
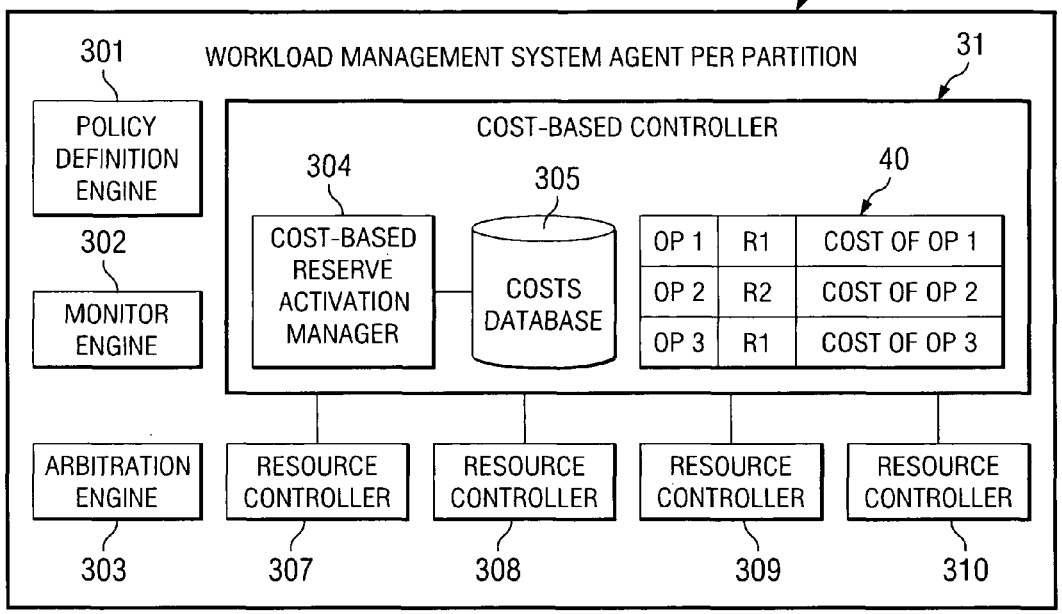

FIG. 3 shows one embodiment 30 of a workload management system having, for example, policy definition engine 301, monitor engine 302 and arbitration engine 303. These engines are utilized to determine the policy available for each user via policy definition engine 301 while monitor engine 302 monitors the actual usage of the various resources. When contentions arise between the different resource allocations arbitration engine 303 mediates disputes between various competing economics and users.

Cost-based controller 31 operates to calculate the costs for the different options using, for example, cost database 305 containing tabulations, such as tabulation 40, showing the different options and costs of the different options.

Resource controllers 307 through 310 control the partitions for each server. Cost-basis reserve activation manager 304 communicates with the resource controllers which are responsible for controlling which resources are available to each application on a partition server basis.

FIG. 4 shows one example 40 of a cost chart for various operations. In this example three activation operations (options) are listed. All are CPUs with a fixed cost allocated to each. Note that in the more general case the resource could be memory or some other computer resource and the cost could be dynamically calculated based on a set of rules. For example, under control of policy definition engine 301, FIG. 3, different costs could be assigned depending on the situation at any given point in time. Thus, memory might be at a premium at a time when CPUs are less expensive.

As shown in chart 40, the intra-transfer operation is a deactivation of a CPU in one partition and the concurrent activation of a CPU in a different partition. In the example shown, the dollar cost of this operation is zero.

Inter-transfer operation is the deactivation of a CPU in one partition in server A and concurrent activation of a CPU in a different partition in server B. The dollar cost of this operation is fixed at $23.00 per operation.

The temporary operation is the activation of a processor for a certain amount of time. The calculated cost for this operation is $87.00 per minute.

Chart 40 as discussed, is maintained by the cost-based allocation manager on a per partition basis and is updated as operations are performed by the workload management system which if desired could be supervised by monitor engine 302.

FIG. 5 shows one embodiment 50 of a process for the selective control of reserve capacity additions. In operation, process 501 initializes the chart of activation operations with availability and costs. For example, chart 40, FIG. 4, is initialized. Assume that additional capacity is required in, for example, server 10-1, partition A. Under such a condition, partition server controller 21-1 (FIG. 1) signals the need for activation of additional capacity with respect to server 10-1, partition A.

Process 503 consults a chart of available activation operations, such as, for example, initialized chart 40, FIG. 4. Process 504 then selects an operation with the least costs.

In this example, an inter-transfer of a CPU resource would yield the least cost ($230) because the time required (3 minutes) would be $261 and on an operational basis 10 operations would be required. However, the inter-transfer operation is not available at this time (see chart 40-FIG. 4). The chart is updated via process 50 and another selection is made. In this case the intra-transfer has become available and thus the cost is zero as performed under process 506. If the performance is now acceptable, process 507 controls the termination. However, if it is not acceptable, then process 507 repeats via processes 502-506 to add additional resources.

The embodiment discussed provides several reserve capacity strategies, beginning with the lowest cost to the user, and moving up the cost ladder using ever-more-costly methods until the need for additional resources is met. Examples of potential strategies sorted by cost (also referred to herein as "potential cost strategies") is as follows:

No cost: Automatically migrates processor licenses from a failed partition to another partition having reserve capacity. The reserve capacity in the server partition becomes active using credits for the resources currently unavailable in the failed partition.

Some cost: Automatically migrates processor licenses from a different partition in the same server to another with an urgent need for more processor power. Also, automatically migrates processor licenses from a different partition in a different server to a partition in troubled server with an urgent need for more processor power.

Higher cost: Activate one or more processor licenses for a short amount of time, similar to a calling card approach.

What is claimed is:

1. A method of changing resource availability to a particular user, said method comprising:
   determining, performed by a computer, a need to change a user's resource allocation for a particular time period; and
   changing, performed by said computer, said resource allocation for said particular time period in a manner that is calculated, based on a plurality of potential cost strategies wherein at least one resource associated with said resource allocation is an electronic component, wherein said changing results in a change in cost to said user that adds the least additional cost to said user.

2. The method of claim 1 wherein said calculation of said least additional cost to said user is done at time of said changing.

3. The method of claim 2 further comprising:
   changing said resource allocation a second time in a manner calculated at the time of said second changing to add the least additional cost to said user.

4. The method of claim 1 wherein said changing comprises:
   selecting resources from among the following resource types:
   intra-transfer, inter-transfer and temporary activation;
   wherein said intra-transfer is the deactivation of a resource in one partition of a server and the concurrent activation of a resource in another partition of the same server, and wherein said inter-transfer is the deactivation of a resource in one server and the concurrent activation of a resource in a second server; and
   wherein said temporary activation is the activation of a resource not previously allocated to said user.

5. A computer system comprising:
   a plurality of resources of a particular type available to the user;
   means for establishing limits on the number of said particular type of resources available to said user at a particular time from a particular partition server;
   means for determining the need for additional ones of said particular type of resources;
   means initialized by said determining means for making an additional resource of said particular type of resources available for use by said user, said additional resource of said particular type of resources selectable from various available pools of resources, each said pool having a different cost associated therewith; and
   means for selecting which resource pool to obtain said additional resource from by, at least in part, selecting the resource pool that is calculated to cause a change in cost to said user and incur the least cost to said user based on a plurality of potential cost strategies.

6. The system of claim 5 wherein said pools are selected from at least two of the following pool types:
   intra-transfer, inter-transfer and temporary activation;
   wherein said intra-transfer is the deactivation of a resource in one partition of a server and the concurrent activation of a resource in another partition of the same server, and wherein said inter-transfer is the deactivation of a resource in one server and the concurrent activation of a resource in a second server; and wherein said temporary activation is the activation of a resource not previously allocated to said user.

7. The system of claim 6 wherein said resources are selected from the list consisting of:
CPU, input/output, bandwidth between resources.

8. The system of claim 6 wherein said resources are CPUs and wherein said additional resource is made available on a temporary basis.

9. The system of claim 6 wherein each of said servers is controlled by a server controller and wherein each of said server controllers are controlled, at least in part, by a system controller.

10. The system of claim 9 wherein said means for determining is at least in part contained within a particular server controller that controls said particular partition server.

11. A computer system comprising:
a server having partitions with each partition having a fixed amount of resources available to a user and wherein some of said fixed amount of resources in each of said partitions are active and some of said fixed amount of resources in said partition are inactive;
at least one additional pool of resources available to said user from time to time, said resources from said at least one additional pool, when activated for use by said user, cause a charge to be made to said user for said use;
a controller for determining when said user requires activation of additional resources; and
said controller further operable to determine from between said inactive same partition resources and said resources from said at least one additional pool which resources, when activated for use by said user, are calculated to cause a change in cost to said user and result in the least additional cost to said user based on a plurality of a plurality of potential cost strategies.

12. The system of claim 11 wherein said controller is further operable for making available to said user from time to time said determined least cost additional resources when said user is determined to require said additional resources.

13. The system of claim 12 further comprising:
an additional server having resources which could be made available to said user; and
wherein at least some of said resources from said at least one additional pool are resources on said additional server.

14. The system of claim 13 wherein each of said servers is controlled by a server controller and wherein each of said server controllers are controlled, at least in part, by a system controller.

15. The system of claim 13 wherein said resources are selected from the list of CPU, input/output, bandwidth between resources.

16. The system of claim 13 wherein said resources are CPUs and wherein said additional resources are made available on a temporary basis.

17. A computer readable non-transitory media having code stored thereon for execution by a processor, said stored code comprises:
code for controlling determination of a need to add resources for a particular user;
code for identifying a set of additional resources that will accomplish a desired workload, said code for identifying calculates that the identified additional resources will cause a change in cost to said user and yield the least amount of cost to said user based on a plurality of potential cost strategies;
code for controlling configuration of resources from said identified additional resources; and
code for controlling addition of said configured resource configuration to said user's available resources.

18. The computer readable non-transitory media of claim 17 wherein said resources are added on a temporary basis.

19. The computer readable non-transitory media of claim 17 further comprising:
code for controlling determination of a need for reducing resources for a particular user; and
code for controlling removal of resources from said user in a manner that will yield the least amount of cost to said user.

20. The computer readable non-transitory media of claim 17 wherein said resources are selected from the list of:
CPU, input/output, bandwidth between resources.

* * * * *